Oct. 21, 1969 J. S. HOWITT 3,473,997
COMPOSITE VEHICLE CLOSURE CONTAINING STRESS
RAISER AND METHOD THEREFOR
Filed Feb. 5, 1968 2 Sheets-Sheet 1

INVENTOR.
John S. Howitt
BY
ATTORNEY

United States Patent Office 3,473,997
Patented Oct. 21, 1969

3,473,997
COMPOSITE VEHICLE CLOSURE CONTAINING STRESS RAISER AND METHOD THEREFOR
John S. Howitt, Horseheads, N.Y., assignor to Corning Glass Works, Corning, N.Y., a corporation of New York
Filed Feb. 5, 1968, Ser. No. 703,072
Int. Cl. D06n 7/04; B32b 17/06
U.S. Cl. 161—164          11 Claims

ABSTRACT OF THE DISCLOSURE

This invention relates to a windshield comprising an outer glass ply, a plastic interlayer and an inner glass ply, wherein a stress raiser is placed in the inner glass ply to insure that it will fracture before the head of an occupant thrown against the windshield in an accident is subjected to excessive concussion-producing forces.

BACKGROUND OF THE INVENTION

Vehicle closures, particularly windshields, are almost universally produced from glass because of its characteristic features of transparency and resistance to abrasion and weathering. However, conventional annealed glass is a brittle material that ordinarily breaks into sharp, jagged pieces. Consequently, the automobile windshield, being made of annealed glass, is among the major factors in personal injury accidents.

Current North American practice is to make windshields with two laminated annealed glass sheets. This has greatly reduced the danger of laceration to occupants from jagged edges of broken glass and from large flying fragments since the plastic interlayer acts to hold the broken fragments in place. However, the windshield is still one of the three or four principal sources of personal injury.

Injury occurs when an occupany is thrown against the windshield. Current windshields of annealed soda-lime glass break readily. Upon breakage the occupant's face and scalp are exposed to sharp stiff glass edges even in cases where the head does not penetrate the plastic interlayer. However, if the windshield is difficult to break or does not break upon violent impact, an effect which has been defined as blunt trauma occurs. Blunt trauma describes skull fracture, concussion, or brain contusions suffered by the head upon impact. The examination of persons involved in automobile accidents who have been thrown against the windshield has demonstrated that lacerations from the broken glass are a much more common source of injury than blunt trauma.

These problems relating to laceration and blunt trauma have long been recognized and numerous solutions have been suggested to minimize them. C. G. Bragaw, Jr. et al. in U.S. Patent No. 2,946,711 have attempted to solve the problems of blunt trauma by utilizing new and thicker plastic interlayers. C. W. Davis, Sr. in U.S. Patent No. 3,282,772 has attempted to solve the problems of laceration and blunt trauma by utilizing inner and outer glass plies of different thicknesses and by utilizing a specific relationship between the thickness of the outer ply and the combined thickness of the inner ply, and plastic interlayer. For other discussions of these problems, see "Safety-Glass for Vehicle Windscreens," R. B. Lister, Glass Technology, volume 2, No. 5, October 1961, "A Review of the Literature on Injury Potential of Automotive Safety Glass," Chester G. Bragaw, June 1, 1962, E. I. duPont de Nemours and Company, and "8th Stapp Car Crash and Field Demonstration Conference Wayne," selected and edited by Lawrence M. Patrick, Wayne State University Press, 1966.

However, none of the above cited attempts has resulted in a truly desirable windshield. Some of the aforementioned problems have been solved by the invention disclosed in copending application, Ser. No. 451,484, "Composite Vehicle Closure," John R. Blizard, filed Apr. 28, 1965. That application described a laminated windshield wherein the inner glass ply is more flexible than the outer glass ply and wherein the inner ply when fractured will dice, or fracture into many fine generally blunt granules; the outer ply, as disclosed therein, fractures into rather large pieces. These two valuable properties have been imparted to the inner glass ply by subjecting the glass to a strengthening technique, preferably chemical strengthening. The ability of the inner ply to dice has substantially reduced injuries from lacerations and the enhanced strength of the sheet has increased the resistance thereof to penetration.

Strengthend glass windshields must be evaluated for the risk of blunt trauma caused by the glass being too strong. A windshield of such great strenth that it would not break even in the most violent accident would not produce lacerations, but it would not be very safe. The concussive forces suffered by the head upon impact would certainly exceed the tolerance level.

One indicator which has been employed to quantitatively measure the factors that produce blunt trauma is the "severity index number." For discussions related to the derivation and development of the severity index number see: (1) "Human Tolerance to Impact Conditions as Related to Motor Vehicle Design" by S.A.E. Handbook Supplement J885, 1964; and (2) "Use of a Weighted-Impulse Criterion for Estimating Injury Hazard" reprinted, by S.A.E., December 1966 from Conference Proceedings, "10th Stapp Car Crash Conference." The severity index number is calculated from the area under the curve resulting from a plot of acceleration forces on the head as a function of time. The numerical value thus obtained is called the severity index number (SIN).

A truly desirable windshield, as stated above, will neither lacerate nor cause blunt trauma. This requires (1) that the inner ply of glass, which is contacted by the head, must fracture into fine, generally blunt granules and (2) that the fracture occurs before the head has been subjected to forces sufficiently high and prolonged to cause blunt trauma or concussion.

Dicing into these granules is assured if the glass fractures while in a highly stressed condition, as developed when it has been bent or deflected by loading from the impacting head. However, if the glass is to strong, the deflection will be so great and the moment or fracture so delayed that an excessively high SIN will be generated and blunt trauma will result. On the other hand, if the glass is too weak, fracture will occur too soon and the glass, not being adequately stressed and deflected, will break into undesirable large particles. It will, furthermore, have less than the desired effect in absorbing the force of impact before the force is dissipated in tearing and penetrating the plastic interlayer. It is not commercially feasible to strengthen the inner ply of glass so precisely that it will in every case fail below the stress level that produces blunt trauma and above the stress level needed to insure fine fracture with nonlacerative particles. Random flaws, present in one piece but not in another, will cause more variation in strength than could be tolerated.

SUMMARY

My invention resides in the discovery that I can allow the windshield to deflect, so as to assure dicing and energy absorption, and still cause it to fail before impact head loading becomes so high or prolonged as to produce blunt trauma. This is accomplished through a particular laminated windshield construction wherein the outer ply is formed of an annealed or somewhat strengthened glass sheet and the inner ply is formed of a strengthened glass sheet which has an integral means for limiting the strength thereof.

This means for limiting the strength of the inner ply of the windshield is such that it will act after the glass has been deflected enough to slow down the impacting body and absorb some of its forward motion, and after the glass has been stressed enough to insure its fracture into fine granules. If a controlled flaw or stress raiser is provided in the inner ply, it is then possible to treat the glass so as to develop great strength therein and to rely on the stress raiser to cause failure at the upper threshold for safety. This strength limiting device could be placed in the area where impacts are most likely to occur, or it could be put near the periphery of the vision area and away from the normally impacted zone.

The stress raiser is located in the surface of the inner ply which is adjacent the plastic interlayer; the aforementioned surface is known as the enclosed surface. When the windshield is impacted, by the occupant, the enclosed surface is placed in tension and the impacted, or exposed, surface of the inner ply is placed in compression; thus, for the stress raiser to be effective it must be located in the enclosed surface of the inner ply. When the stress raiser is enclosed by the plastic interlayer it becomes less visible and hence normally nonobjectionable. Furthermore, this location protects the stress raiser from chemical and/or mechanical damage.

It will be readily understood that the stresses in a windshield in the impact area are highest and that they rapidly decrease as the distance from the impact area is increased. Furthermore, the area where stress due to an impact is at its maximum or within 90% of maximum is normally small, in comparison to the total windshield area. The highly stressed impact area may be a circle about 8″ in diameter. On the other hand, there is a very large peripheral area where the stress due to a head impact is about 20% of maximum.

It has been found by experiments that if stress in the peripheral zone is limited to a maximum of about 14,000 p.s.i. the windshield will break before excessive head loadings are produced. It is believed that the stresses in the impact area should not exceed about 70,000 p.s.i., nor should the fracture occur at less than about 35,000 p.s.i. Thus, failure of the inner glass ply will normally occur when the stress level in the impact area is between 35,000 and 70,000 p.s.i. It has been found that artificial flaws or stress raisers, placed in either the impact area or the peripheral zone, can be made to initiate fracture of the inner ply at the stress levels desired for limiting strength of the windshield.

If the stress raiser or strength limiting device were designed to function at the point of impact, or in the immediate area, it would be necessary to place a very large number of them in windshield to make certain that one would be activated regardless of the location of head impact on the glass.

On the other hand, if the strength limiting device is made to release at a lower stress level it can be put in the peripheral area and, since this lesser stressed area is so great in extent, it is possible to use one, or perhaps, a few, say four or six of such devices to control strength levels regardless of the place of impact on the windshield.

The stress raiser in the peripheral area is made to release at an appropriate fraction of the stress developed at the impact point. It has been found that limiting the strength in the peripheral area to 14,000 p.s.i. allows sufficient deflection and stressing to insure good performance. Furthermore, the initiation of fracture in the peripheral area away from the impacted zone generates finer and blunter fragments in the impacted zone. This is, of course, desirable because this is the prime contact area between the head and the broken glass. Of course, an appropriate stress raiser may be located in the expected impact area, and provide performance essentially the same as that provided when the stress raiser is in the peripheral area.

Flaws produced in the edge periphery of the glass windshield panels by cutting or grinding to shape can also act as stress raisers that limit the blunt trauma effects. However, it must be pointed out that failure at these edge flaws is no as reliable as where the stress raiser is spaced from the edge because they are often so far from the impact point that they will be subjected to very little stress. Furthermore, the windshield will often be secured so tightly to the car body by edge attachment that very little stress can be developed at the edges. Therefore, it is most desirable to employ stress raisers spaced from the edges of the glass.

It must be understood that when using stress raisers in the peripheral area the strength of the inner ply exclusive of the stress raiser, must be high enough so that the central impacted zone can experience local high deformation and stress up to the point where the peripheral stress limiting device is exposed to the predetermined stress that will cause its release.

As a result of this ability to control when and how the glass will break, these windshields are amongst the safest yet developed. This is borne out by tests run at Wayne State University in August 1967.

DESCRIPTION OF THE PREFERRED EMBODIMENT

Figure 1:
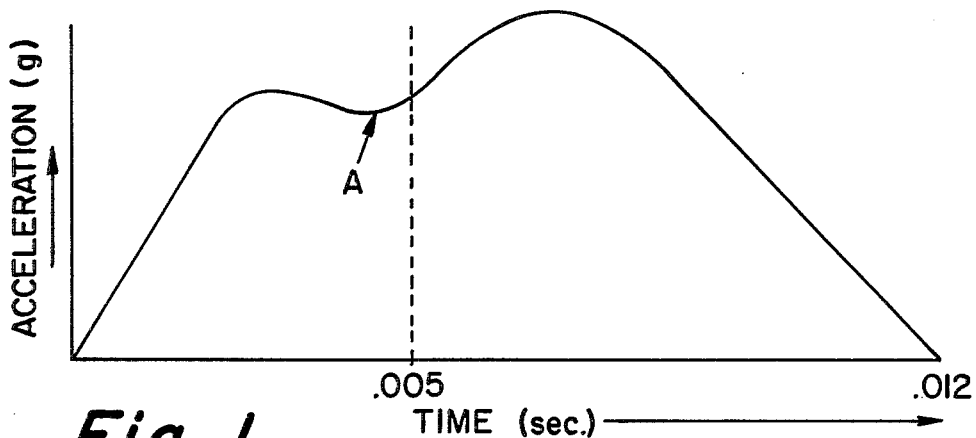
FIGURE 1 is an impluse curve for a windshield comprising a strengthened glass inner ply and an annealed unstrengthened outer glass ply.

The basic windshield of my invention comprises an inner glass ply which is strengthened, an outer glass ply, which may or may not be strengthened, and a plastic interlayer therebetween bonded to at least one of the glass plies. The inner ply may vary in thickness from about 0.060 to 0.100″ but is, preferably, about 0.070″. Inner plies less than 0.060″ are difficult to handle without breakage, so that they are commercially impractical while inner plies greater than .100″ thick, when strengthened, deflect to a lesser amount, produce more lacerative fragments on breaking, and are more apt to cause blunt trauma. The outer ply is, usually, about 0.100″ thick but can range from about 0.085 to 0.120″ thick. A plastic interlayer is bonded to the inner and/or outer ply. The plastic layer, in accordance with normal commercial practice is usually a sheet of about 0.030 inch thick polyvinyl butyral. Several studies have been made to determine the various thicknesses and chemical compositions of interlayer which can be used in windshields. One such study is "Break Properties of Safety Glass as a Function of Gauge of Interlayer," Monsanto Chemical Company, Sept. 21, 1960. Therefore, although the Applicant discloses only a 0.030″ thick interlayer of polyvinyl butyral, one skilled in the art could select many other compositions and thicknesses depending upon his particular problems. The plastic interlayer is bonded to the inner and/or outer plies by the standard commercial technique.

In my preferred embodiment, an inner ply of an alkali metal aluminosilicate glass is employed which has been strengthened in accordance with the practice disclosed in British Patent No. 966,733. Thus, as is described in that patent, an alkali metal aluminosilicate glass is contacted with a source of alkali metal ions having a larger ionic radius than the primary alkali metal ion in the glass at an elevated temperature below the strain point of the glass. For example, a lithium aluminosilicate glass would be contacted with sodium ions and a sodium aluminosilicate glass with potassium ions. This contact causes the larger alkali metal ions of the exetrnal source to replace the smaller alkali metal ions in a surface layer on the glass. This exchange of ions results in the larger ions being "crowded" into sites within the surface layer of the glass previously occupied by the smaller ions and thereby creates compressive stresses in the layer since there is essentially no viscous flow in the glass at temperatures below the strain point to relieve the stresses. To counter balance the compressive stress produced in the surface layer, a tensile stress is produced in the core portion. Thus the surface compression layer increases the strength of the base glass to a very high level.

It is well-recognized in glass technology that freshly-drawn glass fibers, tubing, sheeting, and the like exhibit very high mechanical strengths but injury to the surface thereof occurring through handling or even chemical weathering will sharply reduce these high strengths. As a matter of fact, essentially all annealed glass regardless of composition will exhibit a modulus of rupture of between about 5000–10,000 p.s.i. because of this acute sensitivity of strength to surface injury. Therefore, since substantially all service applications for these windshields contemplate surface abrasion and weathering, a permanent or practical increase in the mechanical strength of the windshield must be retainable after at least moderate surface abrasion. Our experience has indicated that the depth of the surface layer produced through the ion exchange process should be at least 0.002″ and, preferably, about 0.005″ to insure plies which will exhibit high mechanical strength following the necessary handling to assemble a windshield and subsequent surface injury in service. Inasmuch as the rate of the ion diffusion is dependent upon the temperature utilized in the reaction, it can be appreciated that the depth of the surface layer developed is a function of both time and temperature.

In my preferred practice, a glass sheet consisting essentially, by weight on the oxide basis, of about 61.4% $SiO_2$, 12.7% $Na_2O$, 3.6% $K_2O$, 3.7% $MgO$, 0.2% $CaO$, 16.8% $Al_2O_3$, 0.8% $TiO_2$, and 0.8% $As_2O_3$ is immersed in a bath of molten 100% $KNO_3$ operating at 525° C. and maintained therein for 4.5 hours. Potassium ions from the molten salt replace sodium ions within the glass surface to produce a surface compression layer approximately 0.005″ thick. Modulus of rupture measurements have normally demonstrated flexural strengths after moderate surface abrasion ranging between about 50,000–60,000 p.s.i.

We have learned that, since the outer ply of the windshield is usually not strengthened, it is not necessary for it to have the same composition as the inner ply. It is only required that the two glasses be compatible in manufacturing operations and in service.

The ion exchange strengthening technique is much preferred over the long-recognized thermal tempering technique for two reasons: (1) higher mechanical strengths can be developed thereby; and (2) in thermal tempering of such thin glass sheeting it is difficult to control the warpage and distortion. Nevertheless, the utility of a thermally tempered inner sheet is contemplated in my invention.

Figure 2:
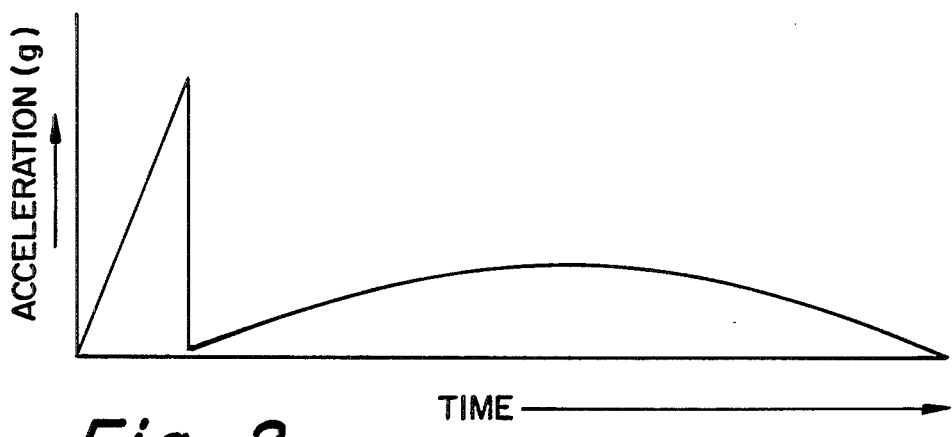
FIGURE 2 is an impulse curve for a windshield comprising annealed unstrengthened inner and outer glass plies.

FIGURE 1 is an impulse curve for a windshield as described above without a stress raiser therein. The curve represents the force received on an occupant's head striking the glass in a high speed accident. The time lapse from the moment of contact to the moment of release due to glass fracture, is about 0.012 second. The SIN for this windshield, as determined from the area under the curve, is very high, thus indicating that this windshield would create problems of blunt trauma. For comparison, the impulse curve for a typical windshield consisting of annealed inner and outer plies is presented in FIGURE 2. The SIN for the annealed windshield is relatively low, thus indicating few problems with blunt trauma. However, one must always keep in mind that the annealed windshield can cause severe laceration problems, where the strengthened will not. Therefore, it would also be desirable to have a relatively low SIN for the strengthened windshield, so that there would, similarly, be few problems with blunt trauma. I have found that this can be accomplished by causing the strengthened windshield to fail at a predetermined stress level so chosen that the acceleration forces and their duration are limited as necessary to insure a SIN that will not cause blunt trauma. In the case of the described windshield glass, fracture was thus made to occur about 0.003 to 0.005 second after impact. Failure of the windshield, initiated at the strength limiting device or stress raiser, did not occur until the glass in the impacted area was stressed to a level that would insure fine granules.

Thus, by causing fracture of the inner ply of this windshield 0.003–0.005 second after initial contact, both the problems of blunt trauma and laceration are kept at a low level. Again, it must be recognized that 0.003–0.005 second is preferred for the windshield described above. However, if the physical characteristics of the windshield, the degree of strengthening, or the glass composition were changed, it might be desirable to change the stress raiser so that it would release either earlier or later as required.

Fracture of the inner ply at a predetermined stress can be controlled by placing at least one stress raiser in the enclosed surface of the inner sheet in the expected peripheral zone. One stress raiser is usually sufficient to cause the desired fracture. However, due to the shape of the windshield and location of the expected stress fields, it may be necessary to use several stress raisers to insure that at least one will be activated no matter where the head impact occurs. Upon impact, the inner and outer ply begin to deflect and the stress at the point of impact begins to build up rapidly. The outer sheet fractures almost immediately since it is unstrengthened or is in any case, much weaker than the inner. This fracture of the outer layer is not extremely significant, with respect to blunt trauma, and is indicated by point A on the curve in FIGURE 1. The outer ply fractures in the known manner into large fragments. Had the outer ply been struck by a stone from the road it would, in the known manner, sustain localized bruises or fracture into large fragments thus not obscuring the driver's vision. After fracture of the outer ply, the inner ply continues to deflect and the stress continues to increase. As the stress at the impact point rises, so also do the stresse in the peripheral area where the stress raisers are placed. When the stress field surrounding the stress raiser reaches about 8,000 to 14,000 p.s.i., depending on the windshield, the inner ply fractures, starting in the stress raiser and almost instantaneously progressing to the impacted area. The resistance of the glass to forward movement of the head suddenly ceases, the acceleration forces drop precipitiously and the G force time plot drops to a low value. The SIN value is thus limited to a relatively low value.

The most desirable location, or locations, for the stress raiser is in the main stress fields radiating from the points where head impact occurs. The location of these fields will vary from one windshield configuration to another because of size, contour, angle, mounting method, etc. These locations can be determined by stress analysis, brittle-coat stressing, or photoelastic stress measurements. Due to the orientation of the windhield, as described above, in the vehicle we have found it advantageous to place the stress raiser in the upper one-half of the windshield. A most convenient place to locate a stress raiser is behind the inside rear view mirror.

The stress raiser should not be so deep that it would penetrate the compressively stressed surface layer. If the stress raiser penetrates the compressively stressed surface layer the strength of the entire ply is reduced to a very low level and, perhaps, even weakened below the glass's normal strength since the stress raiser has penetrated into the core which is in tension. Hence, by penetration of the compressively stressed surface layer the beneficial effects of the strengthening and the stress raiser are lost. Therefore, I normally attempt to keep the minimum fracture stress level in the peripheral area at about 8,000 p.s.i.; thus, the range of stresses at which fracture will initiate is between 8,000 and 14,000 p.s.i. for the windshield of the preferred embodiment.

Figure 3:
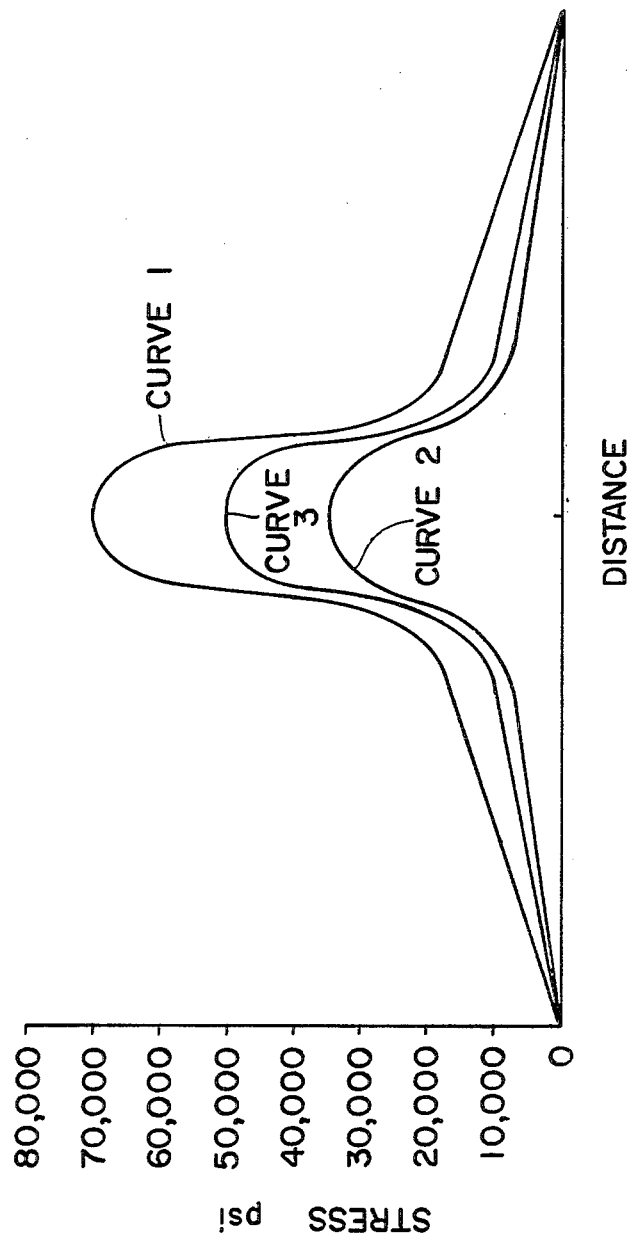
FIGURE 3 is a stress profile from the center of the impact area toward the edge of the windshield.

The fracture stress level in the impact area must be at least 35,000 p.s.i. and should not exceed about 70,000 p.s.i. If fracture occurs before 35,000 p.s.i. is obtained, neither the fine granules nor the desired energy absorption will be attained. On the other hand, if stress is allowed to exceed 70,000 p.s.i. blunt trauma may occur. In the preferred embodiment, I attempt to limit the maximum fracture stress level in the impact area to about 50,000 p.s.i. I have found that the impact area fracture stress can be maintained accurately by controlling the fracture stress level in the peripheral area, between the aforementioned 8,000 and 14,000 levels. FIGURE 3 shows the distribution of stress as related to distance from the impact area for a windshield of the preferred embodiment. The upper curve 1 shows the maximum allowable stress in the impact area; the lower curve 2 is the minimum stress level and curve 3 is the preferred stress distribution. In curve 3 the maximum stress in the impact area is about 50,000 p.s.i. while the stress in the peripheral area is about 9,500 p.s.i.

I have learned that the depth of this stress raiser in my preferred alkali metal aluminosilicate glasses treated with my preferred treatment must be at least about 50% of the total depth of the compressive layer but must not penetrate entirely therethrough. Hence, where the depth of the surface compression layer is about 0.002", a stress raiser of about 0.001" deep will be required; whereas with a compression layer of 0.005" thick, a stress raiser of about 0.0025" deep is necessary.

If the depth of the stress raiser is much less than 50% of the compression layer, fracture of the inner sheet will not be initiated at the preferred 8,000–14,000 p.s.i. level.

The following table indicates the effect of depth of the stress raiser. A 0.070" thick inner sheet having the aforementioned composition was immersed in molten KNO₃ for 4½ hours at 525° C. to attain a surface compression layer of about 0.005" and then a stress raiser was created by an abrasive air blast that cut a 3/16" diameter depression in one surface of the sheet. The air blast was 180 grit alumina in a 35–40 p.s.i. air stream. Strength of annealed, unstrengthened glass sheet ranged between 7000–7500 p.s.i.

TABLE I

| Depth inch: | Fracture stress, p.s.i. |
|---|---|
| 0.001 | 37,000 |
| 0.002 | 22,000 |
| 0.003 | 9,500 |
| 0.004 | 7,500 |
| 0.005 | 7,500 |
| 0.0063 | 7,500 |

It can readily be appreciated that the efficiency of the stress raiser is not only dependent upon the depth thereof but also upon the volume thereof which, in turn, is related to its cross-section. This is clearly illustrated in Table II wherein the same glass which has been strengthened in the manner described in Table I was exposed to an abrasive air blast to give a stress raiser having varying diameters. The depth of the stress raiser in each example was 0.003".

TABLE II

| Stress raiser diameter: | Fracture stress, p.s.i. |
|---|---|
| 0.0625" | 13,700 |
| 0.125" | 9,500 |
| 0.1875" | 9,500 |
| 0.25" | 7,200 |
| 0.50" | 7,200 |

The size of the stress raiser which is required to initiate fracture at the desired 8000–14,000 p.s.i. level is, of course, also dependent upon the depth of the compression layer placed in the glass sheet through the ion exchange process. Hence, where the depth of this compression layer is only about 0.002", an overall diameter of about 0.01" in the stress raiser has been demonstrated to be effective by merely pressing the point of a hardened steel center punch against the surface of the glass sheet to produce an indentation of about 0.001" deep. While this diameter of 0.01" is believed to be a practical minimum, with 0.125"–0.1875" being greatly preferred, it can be understood that a group of much smaller diameter indentations could be placed in the sheet in such close relation to each other as to provide the same effect as the individual stress raiser contemplated by my invention or, alternatively, a diamond scratch placed in the glass surface. Likewise, while stress raisers having diameters about 0.50" have proven effective and this figure is deemed to constitute the reasonable maximum, it can readily be appreciated that by an appropriate combination of depth of compression layer and depth of stress raiser, even greater diameters could be employed. In any event, it is believed that through the proper control of the volume of the stress raiser the failure stress level can be easily regulated. The only overall requirement being that the stress raiser penetrate at least 50% of the depth of the compression layer but not completely therethrough.

If the glass is treated to produce a deeper compression layer, the effect of a stress raiser of a particular depth is decreased. For example, a 3/16" diameter, 0.003" deep stress raiser was placed in 0.070" thick glass sheets having different compression layer thicknesses. They were loaded to fracture and the following results were obtained in Table III.

TABLE III

| Approximate depth of layer: | Fracture stress, p.s.i. |
|---|---|
| .008 | 26,700 |
| .005 | 9,500 |
| .0035 | 7,300 |

Although only one method of producing the stress raiser has been shown above, several other methods may be employed. For example, drilling, etching, or grinding may be used. Furthermore, although a cylindrical type of stress raiser is described in the preferred embodiment other shapes such as a conical shape, V-shaped groove, etc. can be used.

Figure 4:
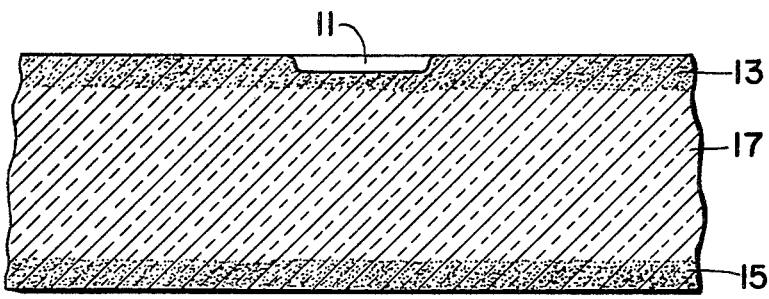
FIGURE 4 is a cross-sectional view of a typical stress raiser in the enclosed surface of the inner ply.

A cross-sectional view of a typical cylindrical stress raiser, 11, as produced by the air blast technique, as shown in FIGURE 4. The speckled portions of FIGURE 4, identified by reference numerals 13 and 15, represent the compressively stressed layers of the inner ply. The untreated core is identified by reference numeral 17. This stress raiser 11 penetrates more than 50% of the compressively stressed layer 13 but not through the entire layer to the untreated core 17.

Therefore, based on the physical characteristics of the windshield, one skilled in the art can readily determine the location, size, depth, and other characteristics of the stress raiser necessary to cause the inner sheet to fracture at the desired stress level, and at the desired time. Besides the empirical data presented herein, classical mechanics teach the various effects of stress raisers and how to calculate such effects.

I claim:

1. In a laminated windshield including an outer glass ply, an inner glass ply spaced therefrom and a plastic interlayer, interposed between the glass plies, inherently bonded to at least one of said glass plies, wherein at least the inner ply is strengthened by a compressively stressed surface layer so that said inner ply has (1) a greater resistance to fracture by a blunt object than the outer ply, (2) greater flexibility than the outer play, and (3) the ability when fractured to dice rather than forming large pieces of glass as does the outer ply, wherein the improvement comprises the inner ply having at least one stress raiser in the surface of said inner ply adjacent to said plastic interlayer so that the inner ply fractures after a predetermined stress level has been exceeded, said stress raiser being at least about .001 inch deep but not penetrating through said compressively stressed layer and the predetermined stress level attained in the impact area, is in the range of 35,000 p.s.i. to 70,000 p.s.i.

2. A windshield in accordance with claim 1 wherein the stress raiser is located in the peripheral area.

3. A windshield in accordance with claim 2 wherein the stress raiser in the peripheral area will cause the fracture of the inner ply at a stress level, in the peripheral area, of between 8,000 and 14,000 p.s.i.

4. A windshield in accordance with claim 3 wherein the stress raiser is located in the upper portion of the peripheral area of the inner ply.

5. A windshield in accordance with claim 1 wherein said inner glass ply has a thickness between about .060 and .100 inch and said outer glass ply has a thickness between about .085 and .120 inch.

6. A windshield in accordance with claim 5 wherein said stress raiser penetrates at least 50% of the compressively stressed surface layer but does not penetrate therethrough, and at least the inner ply is a chemically strengthened alkali aluminosilicate glass.

7. A windshield in accordance with claim 6 wherein said stress raiser is between about .010 and .50 inch in diameter and is located in the peripheral area.

8. A windshield in accordance with claim 7 wherein said stress raiser is between .002 and .0063 inch deep and between .125 and .1875 inch in diameter.

9. A windshield in accordance with claim 8 wherein the stress raiser is located in the upper portion of the peripheral area of the inner ply.

10. In the method for making a laminated windshield comprising an outer glass ply and an inner glass ply spaced therefrom by a plastic interlayer adherently bonded to at least one of said glass plies and wherein at least the inner glass ply is strengthened by a compressively stressed surface layer, the improvement which comprises removing glass from the surface of said inner ply adjacent to the plastic interlayer, so as to provide a stress raiser thereat such that the inner ply will fracture after a predetermined stress level has been exceeded said stress raiser being at least .001 inch deep but not penetrating through said compressively stressed layer.

11. A method as recited in claim 10 wherein said stress raiser is located in the peripheral area of said inner ply.

References Cited
UNITED STATES PATENTS

| | | | |
|---|---|---|---|
| 2,910,807 | 11/1959 | Chan et al. | 161—1 |
| 2,946,711 | 7/1960 | Bragaw et al. | 161—199 |
| 3,169,900 | 2/1965 | Ermlich | 161—192 |
| 3,282,772 | 11/1966 | Davis | 161—199 |
| 3,301,649 | 1/1967 | Marusak | 161—1 |
| 3,396,075 | 8/1968 | Morris | 161—199 |

ROBERT F. BURNETT, Primary Examiner

WILLIAM J. VAN BALEN, Assistant Examiner

U.S. Cl. X.R.

156—101; 161—165, 192, 199